United States Patent
Suzuki

(10) Patent No.: US 8,446,632 B2
(45) Date of Patent: May 21, 2013

(54) IMAGE FORMING APPARATUS WHICH EXECUTES A COLOR REGISTRATION CORRECTION PROCESS AND A DEVIATION CORRECTION PROCESS

(75) Inventor: Chikatsu Suzuki, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 981 days.

(21) Appl. No.: 12/323,502

(22) Filed: Nov. 26, 2008

(65) Prior Publication Data

US 2009/0147284 A1 Jun. 11, 2009

(30) Foreign Application Priority Data

Dec. 5, 2007 (JP) ................. 2007-315111

(51) Int. Cl.
*H04N 1/60* (2006.01)
(52) U.S. Cl.
USPC ............................ 358/1.9; 358/1.18; 399/301
(58) Field of Classification Search
USPC ................... 358/1.9, 1.18; 399/301
See application file for complete search history.

(56) References Cited

U.S. PATENT DOCUMENTS 7,313,352 B2 * 12/2007 Shinohara et al. ............ 399/301

FOREIGN PATENT DOCUMENTS

| JP | 1-142679 A | 6/1989 |
|---|---|---|
| JP | 9-048533 A | 2/1997 |
| JP | 2006-343629 | * 12/2006 |

OTHER PUBLICATIONS

Machine translation for JP2006-343629.*

* cited by examiner

*Primary Examiner* — Qian Yang
(74) *Attorney, Agent, or Firm* — Buchanan Ingersoll & Rooney PC

(57) ABSTRACT

An image forming apparatus having: a plurality of image forming sections each of which forms images of respective colors; an intermediate transfer belt; and a control section which executes a color registration correction process and a deviation correction process, wherein the color correction process includes: forming test images on the intermediate transfer belt by the plurality of image forming sections; measuring the test images thereafter; and correcting image forming positions of the image forming sections in response to the measurement results; and wherein the deviation correction process includes: detecting a deviation of the intermediate transfer belt; and correcting the detected deviation, and wherein, when an amount of correction in the deviation correction process exceeds a predetermined level during the execution of the color registration correction process, the control section executes the color registration correction process again.

4 Claims, 10 Drawing Sheets

IMAGE FORMING APPARATUS WHICH EXECUTES A COLOR REGISTRATION CORRECTION PROCESS AND A DEVIATION CORRECTION PROCESS

This application is based on Japanese Patent Applications No. 2007-315111 filed with Japanese Patent Office on Dec. 5, 2007, the content of which is incorporated herein by reference.

BACKGROUND

1. Field of the Invention

The present invention relates to an image forming apparatus that forms a color image by superimposing images of various colors on a transfer belt, particularly to an image forming apparatus capable of correcting the color misregistration and deviation of a transfer belt.

2. Description of the Related Art

In an image forming apparatus such as a tandem color photocopier using an electrophotographic process, an image forming section including a photosensitive drum, charging device, optical scanning device and development device is provided for each of yellow (Y), magenta (M), cyan (C) and black (K) colors. These devices are arranged along an endless intermediate transfer belt, and a color image formed by superimposing the images of Y, M, C and K colors on the rotating intermediate transfer belt is transferred from the intermediate transfer belt to transfer paper.

When images of various colors are superimposed to form a color image as described above, the image formation positions of different colors must be correctly aligned. Otherwise, color misregistration will occur and a high-quality image cannot be obtained. To solve this problem, a color registration correction method (Japanese Unexamined Patent Application Publication No. 1-142679) has been used as required, wherein a test image for color registration correction known under the name of a registration mark is formed on the intermediate transfer belt, and this image is read by an optical sensor to get the required correction value, whereby the image forming positions for image forming sections of different colors are aligned.

Another solution to the aforementioned problem is provided by the correction control method (Japanese Unexamined Patent Application Publication No. 9-48533) wherein stable traveling of the intermediate transfer belt is achieved by preventing meandering and deviation.

The correction control technique for the deviation of the intermediate transfer belt is normally carried out throughout the process of image formation in order to avoid color misregistration resulting from the meandering or deviation of the intermediate transfer belt. However, if the deviation of the intermediate transfer belt is corrected during the correction of the color registration, the amount of color misregistration measured according to the registration mark will be equal to the sum of the color misregistration caused by the misalignment of the image forming position due to the image forming section and the color misregistration caused by the traveling of the intermediate transfer belt due to deviation. Thus, if color registration is executed according to the measured color misregistration, an error results from the amount of corrections having been made.

In the meantime, if the correction control for the deviation of the intermediate transfer belt is suspended during the correction of color registration, and the intermediate transfer belt is misaligned during the correction of color registration, the amount of color registration correction will be inappropriate. Not only that, this will require much time and effort in returning the deviated transfer belt to the appropriate position upon completion of correcting the color registration.

The object of the present invention is to solve the aforementioned problems and to provide an image forming apparatus capable of providing adequate correction of color registration while preventing the deviation of an intermediate transfer belt.

SUMMARY

The object of the present invention can be achieved by the following invention.

An image forming apparatus that carries out color image formation, comprising: a plurality of image forming sections each of which forms images of respective colors; an intermediate transfer belt on which plural images of respective colors formed by the plurality of image forming sections are transferred and are superimposed to form a color image; and a control section which executes a color registration correction process and a deviation correction process, wherein the color correction process comprises: forming test images on the intermediate transfer belt to correct position errors of each color image of the images formed by the plurality of image forming sections; measuring the test images on the intermediate transfer belt thereafter; and correcting image forming positions of the image forming sections in response to the measurement results; and wherein the deviation correction process comprises: detecting a deviation of the intermediate transfer belt; and correcting the detected deviation, and wherein, when an amount of correction in the deviation correction process exceeds a predetermined level during the execution of the color registration correction process, the control section executes the color registration correction process again.

DESCRIPTION OF THE PREFERRED EMBODIMENT

The following describes the embodiments of the present invention with reference to the drawings.

Figure 1:
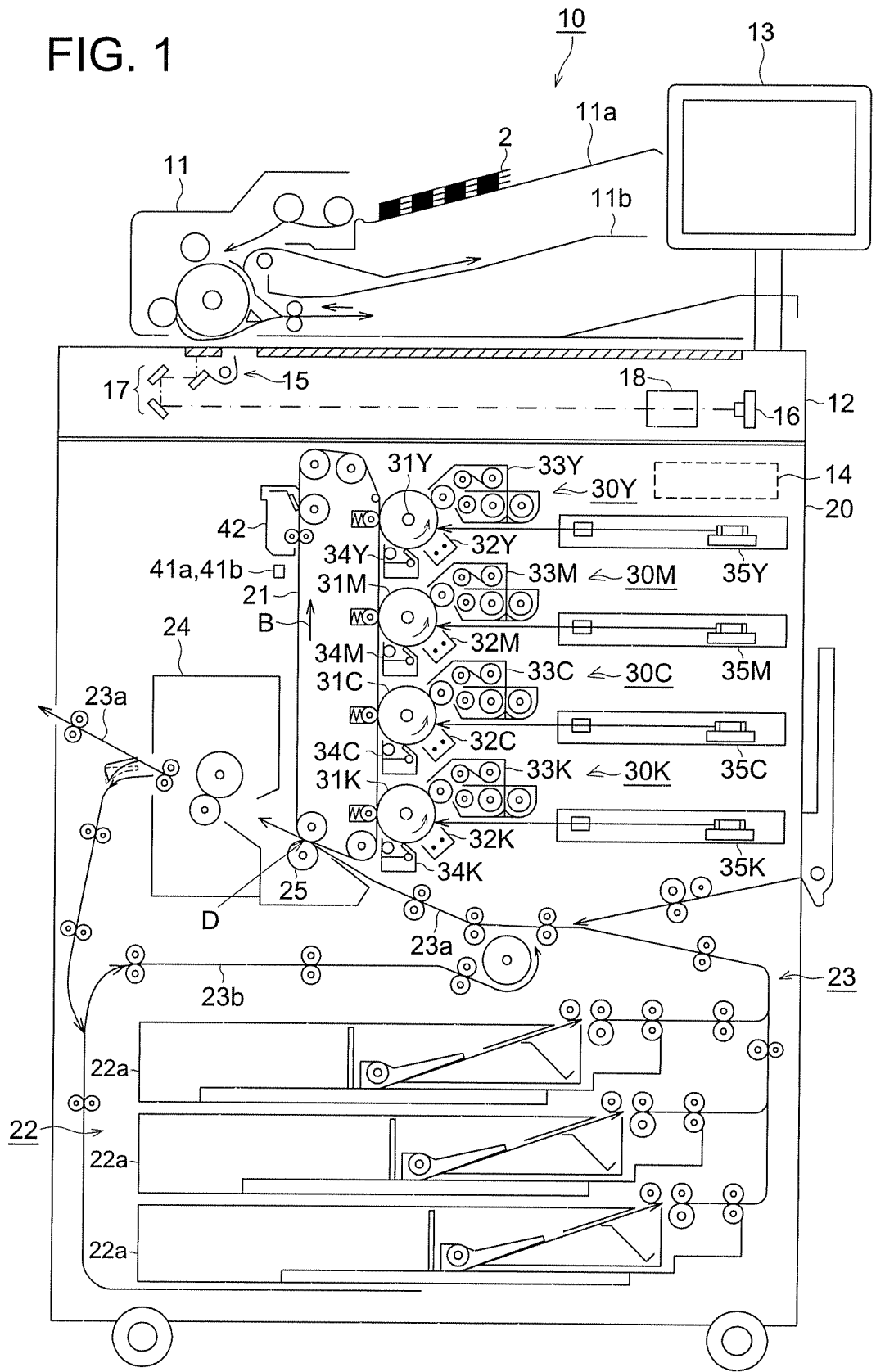
FIG. 1 is an explanatory diagram representing a cross section of an image forming apparatus as an embodiment of the present invention.
Figure 2:
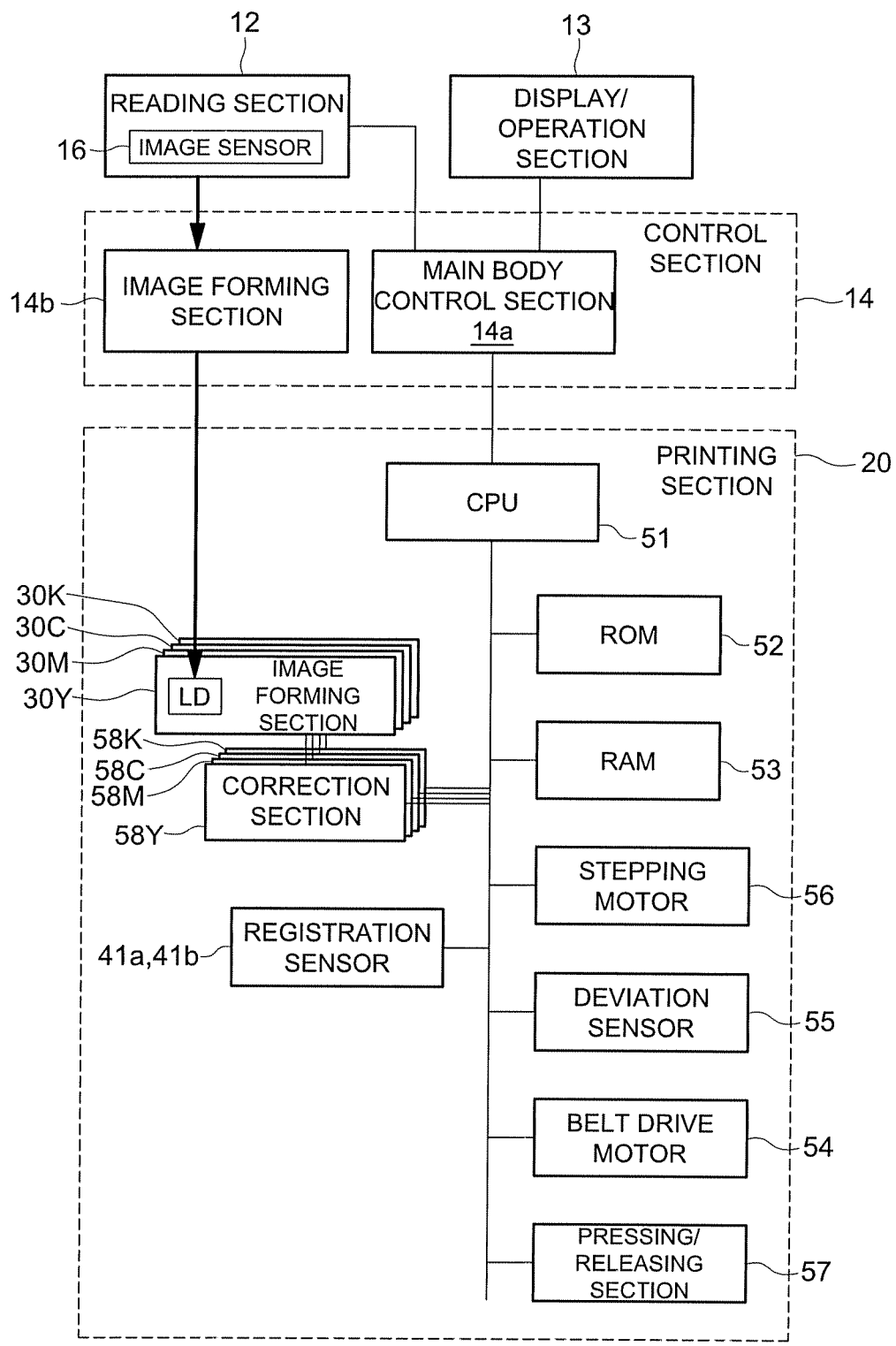
FIG. 2 is a diagram representing the electric schematic structure of an image forming apparatus as an embodiment of the present invention.

FIG. 1 shows the cross section of an image forming apparatus 10 as an embodiment of the present invention. FIG. 2 shows the electric schematic structure of the image forming apparatus 10. The image forming apparatus 10 is an apparatus called the color digital photocopier, and includes an automatic document feed apparatus 11, reading section 12, display/operation section 13, control section 14 and printing section 20.

The automatic document feed apparatus 11 (FIG. 1) feeds the documents 2 stacked on a document placement 11a, one by one to the reading position of the reading section 12, and ejects the documents having been read, to a sheet ejection tray 11b.

The reading section 12 reads the document in color. The reading section 12 includes an exposure scanning section 15 made up of a light source and mirror; a color line image sensor 16 for receiving the light reflected from the document and for outputting the electric signal for each color conforming to the light intensity; various forms of mirrors 17 for leading the light reflected from the document to the line image sensor 16; and a condensing lens 18.

The printing section 20 is a tandem image forming apparatus, and includes an endless intermediate transfer belt 21; a plurality of image forming sections 30Y, 30M, 30C and 30K each forming a single colored toner image on the intermediate transfer belt 21; a sheet feed section 22 for feeding transfer sheets; a conveyance section 23 for conveying the transfer sheets having been fed; and a fixing apparatus 24.

The image forming section 30Y forms a yellow (Y) image on the intermediate transfer belt 21. The image forming section 30M forms a magenta (M) image on the intermediate transfer belt 21. The image forming section 30C forms a cyan (C) image on the intermediate transfer belt 21. The image forming section 30K forms a black (K) image on the intermediate transfer belt 21.

The image forming section 30Y contains a photoreceptor 31Y as a cylindrical electrostatic latent image carrier on the surface of which an electrostatic latent image is formed; a charging device 32Y arranged on the periphery thereof; a development device 33Y; and a cleaning device 34Y. The image forming section 30Y also contains a laser unit 35Y mode up of a laser diode, polygon mirror, lenses, mirror and the like.

Figure 3:
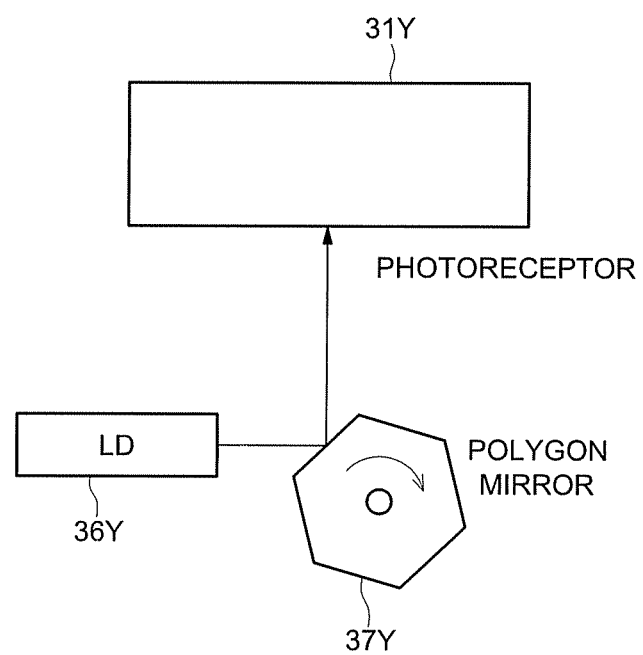
FIG. 3 is an explanatory diagram showing how the photoreceptor is scanned by a laser beam reflected by a polygon mirror.

Driven by a drive section (not illustrated), the photoreceptor 31Y rotates in a predetermined direction (arrow A in the drawing), and the charging device 32Y charges the photoreceptor 31Y uniformly. As shown in FIG. 3, the laser unit 35Y ensures that the laser beam emitted from a laser diode 36Y is reflected by a rotating polygon mirror 37Y, whereby the surface of the cylindrical photoreceptor 31Y is repeatedly scanned by the laser beam in the axial direction (main scanning direction).

The surface of the photoreceptor 31Y is scanned by the laser beam which is turned on or off in response to the yellow image data, whereby an electrostatic latent image is formed on the photoreceptor 31Y. The development device 33Y develops the electrostatic latent image on the photoreceptor 31Y using the yellow toner. The toner image formed on the surface of the photoreceptor 31Y is transferred onto the intermediate transfer belt 21 at the position in contact with the intermediate transfer belt 21. The cleaning device 34Y uses a blade or the like to scrape off, remove and collect the toner remaining on the surface of the photoreceptor 31Y after transfer.

The image forming section 30M, image forming section 30C and image forming section 30K are structured in the same manner as the image forming section 30Y, except that the toner colors are different, and the laser beam is turned on or off according to the image data corresponding to each of the colors. Accordingly, the image forming sections 30M, 30C and 30K will be described to avoid duplicated description. In the drawing, the components having the same structure but with different colors have the same reference numerals with subscript M, C or K added thereto instead of Y.

The intermediate transfer belt 21 is applied to a plurality of rollers and is rotated thereby. In the process of image formation, the intermediate transfer belt 21 rotates in the direction of arrow B. In the process of rotation, the images of different colors (toner images) are formed on the intermediate transfer belt 21 in the order of (Y), (M), (C) and (K) so as to be superimposed on one other by the image forming sections 30Y, 30M, 30C and 30K. At the secondary transfer position D, this color image is transferred to the transfer paper from the intermediate transfer belt 21.

A pair of registration sensors 41a and 41b made up of a reflection type optical sensor for detecting the registration mark on the intermediate transfer belt 21 are installed on the upstream side of the secondary transfer position D. Two registration sensors 41a and 41b are installed separately from each other across the intermediate transfer belt 21. A belt cleaning device 42 for removing the toner remaining on the intermediate transfer belt 21 subsequent to transfer is installed further down on the downstream side of the registration sensors 41a and 41b.

The sheet feed section 22 has a plurality of sheet feed cassettes 22a for accommodating the transfer sheets used for printing, and feeds the transfer sheets one by one to the conveyance section 23 from the selected sheet feed cassette 22a. The conveyance section 23 includes a normal path 23a that allows the transfer sheets fed from the sheet feed cassette 22a to pass through the secondary transfer position D and fixing apparatus 24, and ejects them out of the machine; and a reversing path 23b that, after reversing the transfer sheets having passed through the fixing apparatus 24, merges them into with the normal path 23a again on the upstream side of the secondary transfer position D. This is designed to meet the double-sided printing requirements.

As shown in FIG. 2, the control section 14 includes a main body control section 14a and an image forming section 14b. The main body control section 14a controls the entire operation of the image forming apparatus 10, and is made up of such major components as a CPU (Central Processing Unit), ROM (Read Only Memory) and RAM (Random Access Memory). The image forming section 14b applies image processing to the image data of different colors inputted from the line image sensor 16 of the reading section 12 and stores the image data temporarily. After that, the image data for the (Y), (M), (C) and (K) colors obtained by extending this data is outputted to the image forming sections 30Y, 30M, 30C and 30K of the printing section 20 by this image forming section 14b.

The control section 14 is connected with the reading section 12, display/operation section 13, printing section 20 and others. The display/operation section 13 receives various forms of operations from the user and displays various types of operation screens, setting screens and guide screens for the user. For example, the display/operation section 13 is composed of a liquid crystal display whose surface is provided with a touch panel for detecting the depressed position, and other switches.

The control section 14 controls the operation of the printing section 20 through the CPU 51 of the printing section 20. The CPU 51 is connected with the ROM 52 storing the programs or various forms of fixed data, and the RAM 53 serving as a work area when the CPU 51 executes a program, as well as the electric components (not illustrated) of the sensors and driving parts related to the sheet feed section 22, conveyance section 23 and fixing apparatus 24.

The control section 14 is responsible for corrections to the deviation of the intermediate transfer belt 21 through the CPU 51 of the printing section 20, and color registration corrections for detecting and correcting the misregistration of different colors superimposed on the intermediate transfer belt 21. To put it in greater detail, the CPU 51 is connected with: a belt drive motor 54 for driving the intermediate transfer belt 21; a stepping motor 56 for driving the mechanism that corrects the deviation of the intermediate transfer belt 21; and a pressing/releasing section 57 for switching between the mode of pressing wherein a transfer roller (or secondary transfer belt) for pressing the transfer sheets against the intermediate transfer belt 21 at the secondary transfer position D is pressed against the intermediate transfer belt 21, and the mode for releasing wherein the transfer roller is released and separated from the transfer sheets. The pressing/releasing section 57 uses a motor and solenoid to execute the pressing and releasing functions.

The CPU 51 is connected with the correction sections 58Y, 58M, 58C and 58K, and the aforementioned registration sensors 41*a* and 41*b*, wherein these correction sections are mounted in response to the image forming sections 30Y, 30M, 30C and 30K and are used to correct color misregistration through fine adjustments to the time interval for turning on or off the laser beam conforming to the image data.

In the first place, the following describes the method for controlling the deviation of the intermediate transfer belt 21 (hereinafter referred to as "steering control").

Figure 4:
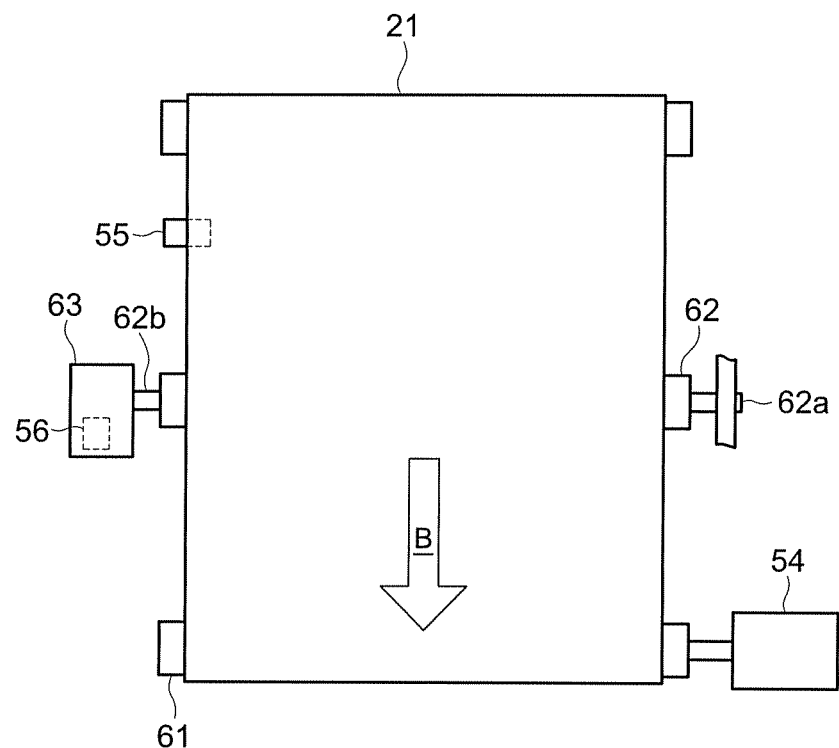
FIG. 4 is an explanatory diagram schematically showing the drive mechanism of the intermediate transfer belt.
Figure 9:
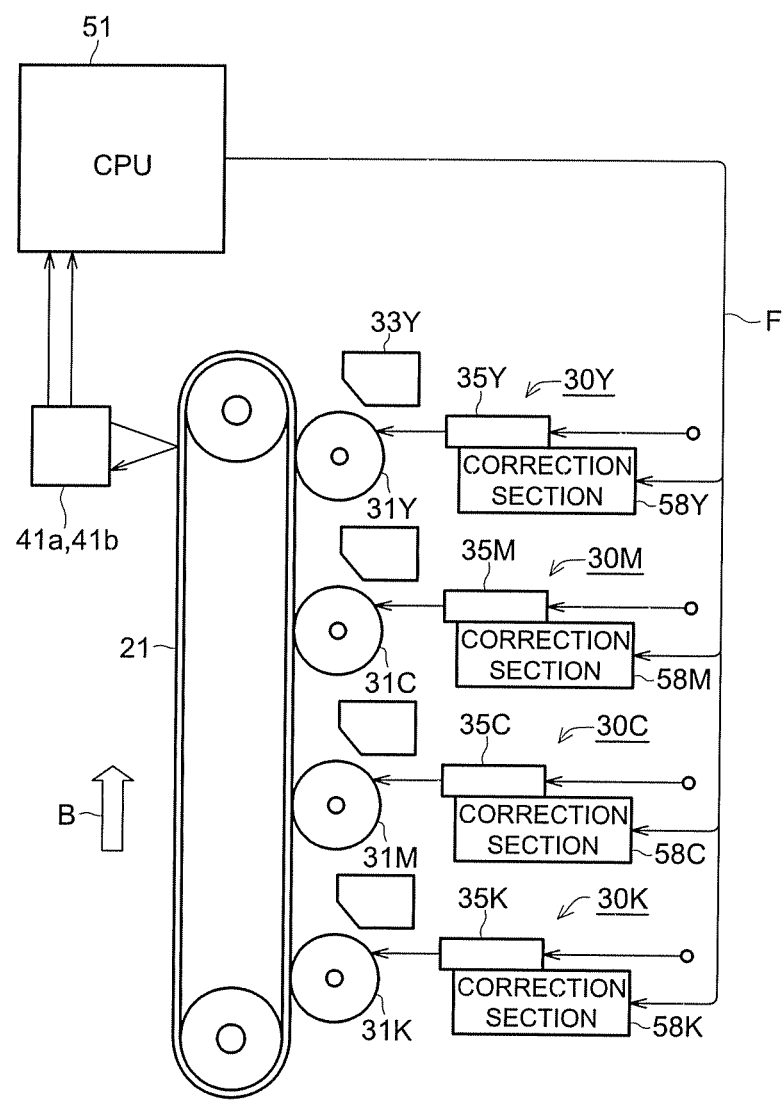
FIG. 9 is an explanatory diagram schematically showing the components related to color registration correction.

FIG. 4 schematically shows the drive mechanism of the intermediate transfer belt 21. The intermediate transfer belt 21 is applied to a plurality of cylindrical rollers, and constitutes a circulating path (FIGS. 1 and 9). Of the rollers, the drive roller 61 is driven by the belt drive motor 54, and other rollers are driven motors that have no driving force. The adjusting roller 62 is mounted so that the inclination of the axis can be changed about the one end 62*a* thereof. The other end 62*b* of the adjusting roller 62 is shaft-supported by the movable bearing 63 made up of a gear, stepping motor 54 and others. By driving the stepping motor 56 in the forward or reverse direction, the angle of the shaft of the adjusting roller 62 can be adjusted within a predetermined angle (plus/minus) with reference to the position parallel to the shaft of the drive roller 61.

An deviation sensor 55 is provided to detect the position of the intermediate transfer belt 21 (position relative to the reference position) in the direction wherein deviation is likely to occur (across the width of the intermediate transfer belt 21). A photo sensor for detecting the end of the intermediate transfer belt 21, for example, is used as the deviation sensor 55.

Figure 5:
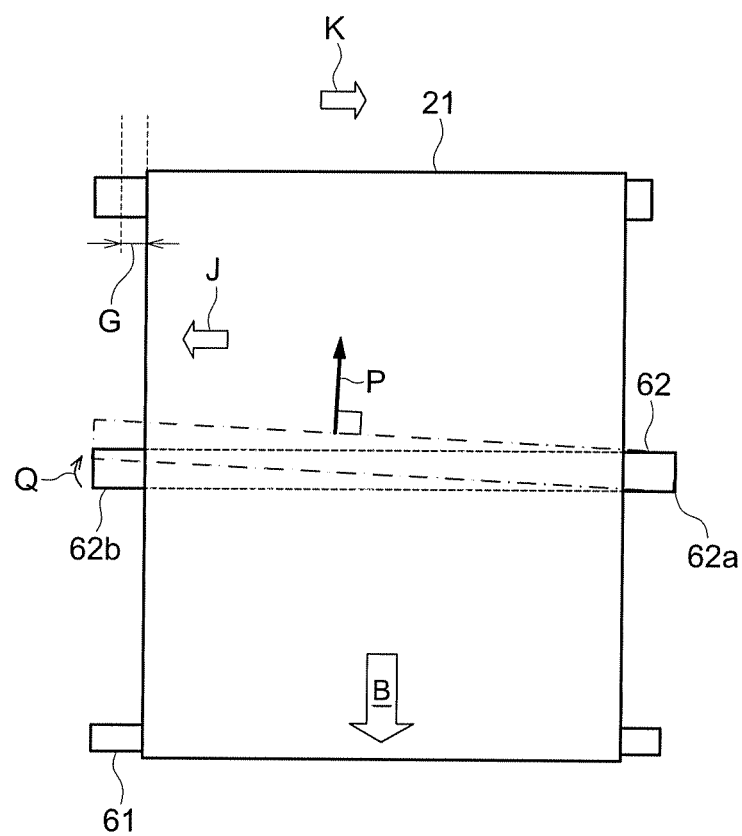
FIG. 5 is an explanatory diagram showing an example of correcting deviation.

FIG. 5 shows a specific example of the steering control that detects and corrects the deviation of the position across the intermediate transfer belt 21. Steering control is provided in such a way that, when the intermediate transfer belt 21 has been misaligned across the width, the misalignment G is detected by the deviation sensor 55, and the inclination of the adjusting roller 62 is adjusted so that the intermediate transfer belt 21 moves in the direction wherein the misalignment is corrected. For example, in the example of FIG. 5, control is provided in such a way that, when the intermediate transfer belt 21 has been misaligned in the direction J of deviation, the inclination of the adjusting roller 62 is changed (correction Q in the diagram) so that the belt will move in the belt traveling direction opposite thereto. As described above, force in the direction P of the diagram is applied to the intermediate transfer belt 21 by changing the inclination of the adjusting roller 62, whereby the misalignment of the intermediate transfer belt 21 is changed. The steering control is implemented by the CPU 51. Steering control is carried out throughout the image forming operation (during printing operation).

The following describes the method for correcting the color registration.

Figure 6:
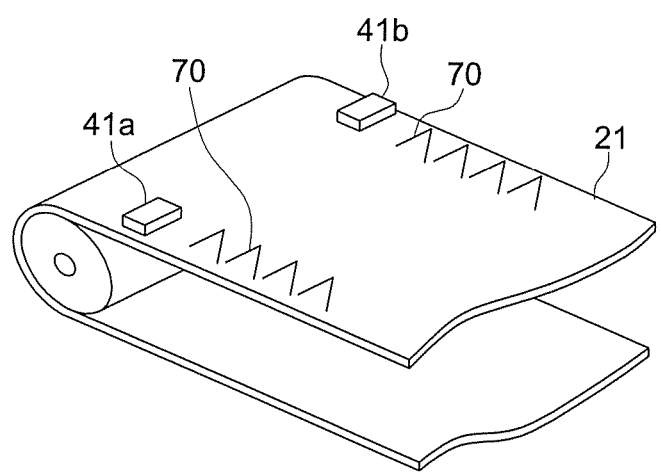
FIG. 6 is an explanatory diagram illustrating how a registration mark is formed on the intermediate transfer belt.
Figure 7:
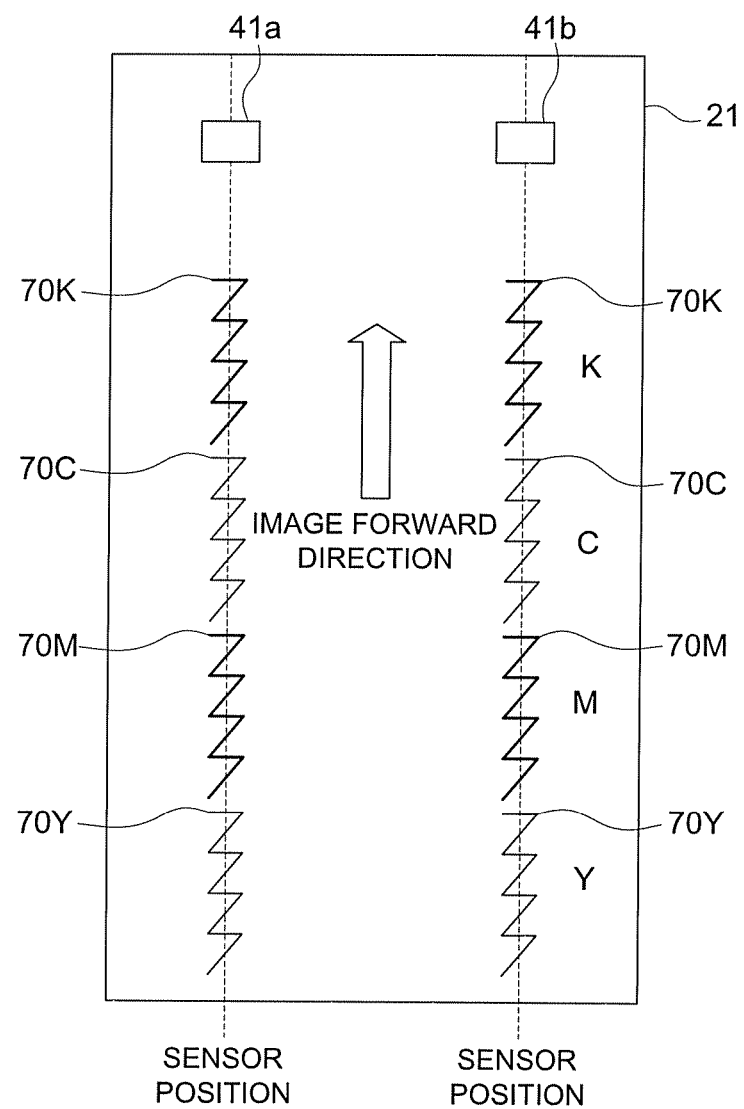
FIG. 7 is an explanatory diagram illustrating how registration marks of different colors are formed on the intermediate transfer belt.

During the correction of color misregistration, the registration marks 70Y, 70M, 70C and 70K of respective colors are formed by the image forming sections 30Y, 30M, 30C and 30K and transferred onto the intermediate transfer belt 21 as test images for color registration as shown in FIGS. 6 and 7. These marks are read by the registration sensors 41*a* and 41*b* to detect the misregistration of the registration marks 70Y, 70M, 70C and 70K. The result of this detection provides a basis for correcting the positions wherein the images of respective colors are formed, to ensure that there will be no color misregistration.

To put it in greater detail, the registration marks 70Y, 70M, 70C and 70K are formed in a zigzag manner wherein the crosswise line image of the intermediate transfer belt 21 and oblique line image are alternately repeated (four times in the diagram). The registration marks 70Y, 70M, 70C and 70K are formed in the vicinity of both ends of the intermediate transfer belt 21 across the width. They are read and detected by the registration sensors 41*a* and 41*b*.

Figure 8:
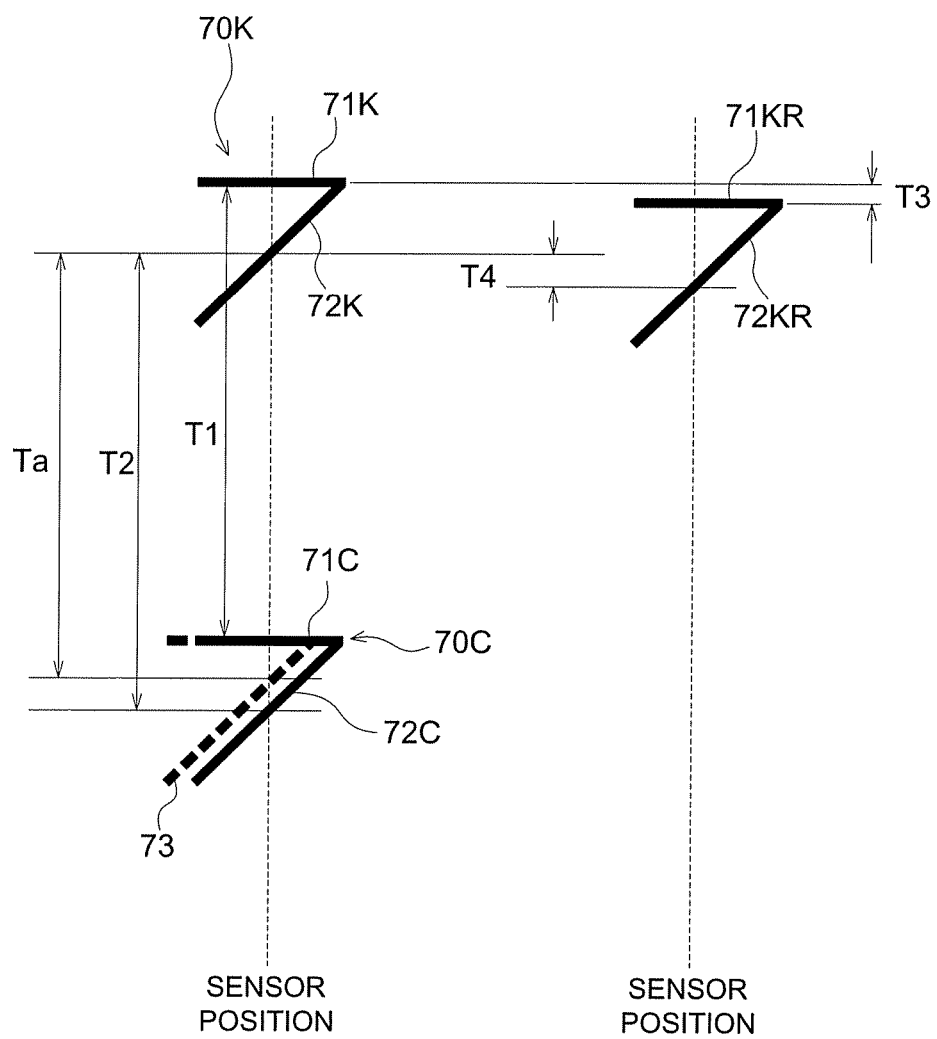
FIG. 8 is an explanatory diagram showing how the position errors of images of different colors are determined from the registration mark.

FIG. 8 shows how the position errors of images of respective colors and the lateral magnification are determined from the registration marks. The positional relationship in the sub-scanning direction of the K- and C-colored images (in the direction wherein the intermediate transfer belt is conveyed) is identified, for example, based on the length of time T1 from the detection of the first line image 71K of the K-colored registration mark 70K across the width to the detection of the first line image 71C of the C-colored registration mark 70C across the width.

The positional relationship in the main scanning directions of the K- and C-colored images (across the width of the intermediate transfer belt 21) is identified from the relationship between the time T2 from the detection of the oblique first line image 72K of the K-colored registration mark 70K to the detection of the oblique first line image 72C of the C-colored registration mark 70C, and the time T1 having been detected previously. If T1=T2, there is no position error in the main scanning direction. If T2 is shorter than T1 as shown in Ta of the diagram, the C-colored image is shown to have been misaligned to the left of the K-colored image, as indicated by the broken line of the diagram. Further, the amount of position error can be identified from the time difference between T1 and T2.

Further, the skew (inclination) of the K-colored image can be detected from the difference (T3) between the time when the left registration sensor 41*a* has detected the crosswise first line image 71K on the left row of the K-colored registration mark 70K, and the time when the right registration sensor 41*b* has detected the crosswise first line image 71KR on the left row. The lateral magnification of the K-colored image can be identified from the difference between the difference (T4) between the time when the left registration sensor 41*a* has detected the oblique first line image 72K on the left row of the K-colored registration mark 70K, and the time when the right registration sensor 41*b* has detected the oblique first line image 72KR on the right row, and the aforementioned T3. In the same manner, the position errors, skew and magnification of other colors can be detected.

FIG. 9 schematically shows the components related to color registration correction. The CPU 51 calculates the position error of the image (color misregistration) in the aforementioned manner, and provides the correction sections 58Y, 58M, 58C and 58K with the instructions specifying the amount F of correcting in such a way that the image formation position error will be corrected (the position error will be reduced to zero). For example, when an image has a color misregistration in the main scanning direction, the correction sections 58Y, 58M, 58C and 58K adjust the time from inputting of the horizontal synchronization signal denoting the time interval when the laser beam has crossed the reference position in the main scanning direction, to the initiation of the on-off control of the laser beam in response to the image data of each line.

If the steering control of the intermediate transfer belt 21 is started during the correction of the aforementioned color registration, the amount of color misregistration measured based on the registration marks 70Y, 70M, 70C and 70K will be the sum of the amount of color misregistration resulting from the image formation position error caused by the image forming sections 30Y, 30M, 30C and 30K, and the amount of color misregistration resulting from the traveling of the intermediate transfer belt 21 caused by the steering control. If color registration is corrected based on the measured amount of the color misregistration, the amount of correction may be inadequate. In the meantime, if the deviation correction control of the intermediate transfer belt 21 is suspended during the process of correcting the color registration, the amount of correction to the color registration will be inadequate when the intermediate transfer belt is considerably misregistered during the process of correcting the color registration. Not only that, it will be very difficult to get the considerably lopsided intermediate transfer belt 21 back to the adequate position after correction of the color registration. To solve this problem, the control section 14 executes the process of correcting the deviation (steering control) during the process of correcting the color registration, but the color registration correction is started over again if the amount of correction to the deviation (steering amount) exceeds the tolerance.

Figure 10:
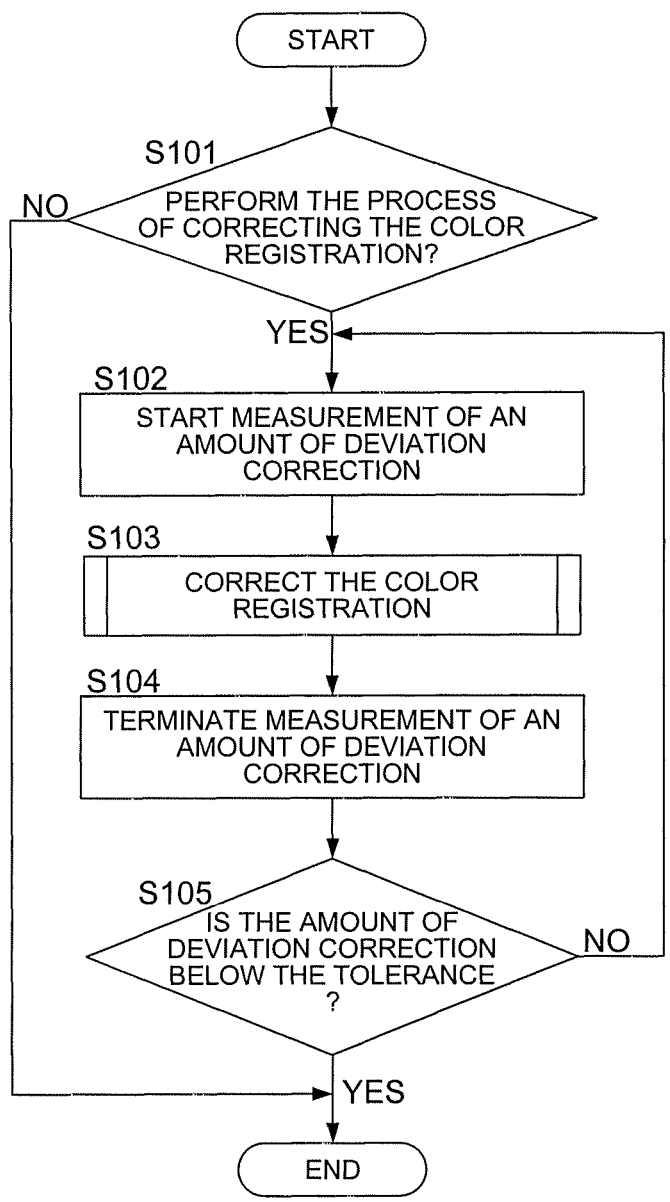
FIG. 10 is a flow chart showing the operation of the image forming apparatus in the process of correcting the color registration and deviation.

FIG. 10 shows the flow of control by the control section 14 in the process of correcting the color registration. In this case, the steering control is implemented during the process of correcting the color registration. In the first place, a step is taken to determine whether or not the time is right to correct the color registration (Step S101). Color registration correction is executed for a predetermined number of prints (e.g., 1,000 sheets). Alternatively, it is executed when correction is determined to be necessary, according to the temperature or humidity inside the apparatus, or an instruction to execute the correction has been received from the user.

When the time is not right to execute the process of correcting the color registration (N in Step S101), this processing is terminated (END). When the time has come to correct the color registration (Y in Step S101), a step is taken to initiate the measurement of the amount of correcting for the deviation by steering control (Step S102), whereby color registration is corrected (Step S103).

When the color registration correction has terminated, measurement of the amount of deviation correction by steering control is terminated (Step S104). Thus, the system acquires the amount of deviation correction executed during the time period from the start of measurement in Step S102 to the termination of measurement in Step S104. More preferably, measurement starts with the start of forming the registration mark 70 on the intermediate transfer belt 21, and terminates with the last registration mark having been read by the registration sensors 41a and 41b.

A step is taken to determine whether or not the amount of deviation correction having been acquired has exceeded a predetermined tolerance. If it has exceeded the tolerance (N in Step S105), the system goes back to Step S102 to start the procedure over again. If this amount has not exceeded the tolerance (Y in Step S105), the system considers that this correction of color registration has been executed adequately while the intermediate transfer belt 21 is placed under stable conditions, and terminates this processing (END).

As described above, color registration correction process is executed while steering control is implemented. This eliminates the possibility of considerable misregistration of the intermediate transfer belt 21 during the color registration correction. If the amount of deviation correction has exceeded the tolerance, color registration is corrected while traveling of the intermediate transfer belt 21 is unstable. In this case, however, color registration correction process is started over again. This arrangement eliminates the possibility of color registration being caused by the printing operation executed based on the possible inadequate color registration correction.

The amount of deviation correction to be compared with the tolerance can be (1) the sum of the amount of the deviation corrections from the start of measurement to the termination of measurement (preferably the sum of the absolute value of the deviation corrections), or (2) an amount of the deviation correction per unit time from the start of measurement to the termination of measurement (preferably the maximum value thereof). Either of the two can be utilized. It is also possible to arrange such a configuration that both are used in parallel, and if one of them exceeds the tolerance or both of them exceed the tolerance, color registration correction process is started over again.

During the printing operation, the transfer roller for pressing the transfer sheet against the intermediate transfer belt 21, and the secondary transfer belt are pressed against the intermediate transfer belt 21 in the secondary transfer position D. Color registration correction is executed when this pressurized condition is released. If the pressure is applied or released, the traveling condition of the intermediate transfer belt 21 is affected. Thus, it is preferred to adopt such a structure that the pressing/releasing section 57 is controlled to release the pressure; then, steering control is executed for a predetermined period of time until the traveling condition of the intermediate transfer belt 21 is stabilized. After that, the measurement of Step S102 is started and the color registration correction is executed.

In the aforementioned embodiment of the present invention, the control section implements the color registration correction while the deviation correction control is executed. If the amount of deviation corrections executed during this period has exceeded the tolerance, the color registration correction is started over again. Since the deviation correction control is executed during the color registration correction, any serious position error of the transfer belt does not occur during this time.

If there is a large amount of deviation corrections, this means that color registration has been executed while the intermediate transfer belt is traveling under the unstable condition. The control section allows the color registration correction to be started over again. In the meantime, if the amount of deviation corrections is below the tolerance, this means that color registration has been executed while the intermediate transfer belt is traveling under the stable condition. The control section adopts the results of this color registration correction as an adequate operation.

The image forming apparatus of the present invention prevents deviation of the intermediate transfer belt, and ensures appropriate color registration corrections.

The embodiment of the present invention has been described with reference to diagrams. It is to be expressly understood, however, that the present invention is not restricted thereto. The present invention can be embodied in a great number of variations with appropriate modifications or additions, without departing from the technological spirit and scope of the invention claimed.

The method of deviation correction of the intermediate transfer belt 21 is not restricted to that using the mechanism indicated in FIG. 4. Any other method can be used if the deviation is corrected. Further, the shape of the registration mark during the color registration correction or the method of evaluating the amount of color registration are not restricted to those exemplified in the description of the embodiment.

In the aforementioned embodiment, after termination of the color registration correction, evaluation is made to see whether or not the amount of deviation correction is abnormal (exceeding the tolerance). It is also possible to adopt such a structure that evaluation is made constantly during the process of color registration correction, and if the tolerance has been exceeded, color registration correction is suspended, and the procedure is started again.

The image forming apparatus 10 is not restricted to the multi-functional peripheral. Any image forming apparatus having a color printing function can be utilized.

What is claimed is:

1. An image forming apparatus that carries out color image formation, comprising:
   a plurality of image forming sections each of which forms images of respective colors;
   an intermediate transfer belt on which plural images of respective colors formed by the plurality of image forming sections are transferred and are superimposed to form a color image; and
   a control section which executes a color registration correction process and a deviation correction process,
   wherein the color registration correction process comprises:
   forming test images on the intermediate transfer belt to correct position errors of each color image of the images formed by the plurality of image forming sections;
   measuring the test images on the intermediate transfer belt thereafter; and
   correcting image forming positions of the plurality of image forming sections in response to the measuring of the test images;
   and wherein the deviation correction process comprises:
   detecting a deviation of a position of the intermediate transfer belt across the intermediate transfer belt; and
   correcting the detected deviation by moving the intermediate transfer belt,
   and wherein the control section i) starts a measurement of an amount of correction by the deviation correction process when a time has come to start the color registration correction process, ii) terminates the measurement of the amount of correction by the deviation correction process when the color registration correction process has terminated, iii) acquires the amount of correction in the deviation correction process executed during the time period from the start of the measurement to the termination of the measurement, iv) determines whether or not the acquired amount of correction exceeds a predetermined level, and v) executes the color registration correction process again when it is determined that the acquired amount of correction exceeds the predetermined level.

2. The image forming apparatus of claim 1, wherein the amount of correction in the deviation correction process is an amount of the deviation correction per unit time.

3. The image forming apparatus of claim 1, further comprising a deviation sensor arranged at a longitudinal edge of the intermediate transfer belt to detect the deviation of the position of the intermediate transfer belt across the intermediate transfer belt.

4. The image forming apparatus of claim 1, wherein the correction section does not execute the color registration correction process again when it is determined that the acquired amount of correction does not exceed the predetermined level.

* * * * *